United States Patent
Rodriguez

Patent Number: 5,664,645
Date of Patent: Sep. 9, 1997

[54] BRAKING MEANS FOR SHOPPING CART

[76] Inventor: Otto M. Rodriguez, 5708 Lost Grove Dr., Lilburn, Ga. 30247

[21] Appl. No.: 701,626

[22] Filed: Aug. 22, 1996

[51] Int. Cl.⁶ .............................. B60B 33/00; B62B 5/04
[52] U.S. Cl. ......................... 188/1.12; 188/19; 16/35 R
[58] Field of Search ............................ 188/1.12, 19, 30, 188/82, 84; 161/35 R, 24

[56] References Cited

U.S. PATENT DOCUMENTS

| | | | |
|---|---|---|---|
| 2,799,514 | 7/1957 | Kramcsak, Jr. | 16/35 R X |
| 5,012,550 | 5/1991 | Schlosser | 188/1.12 X |

Primary Examiner—Peter M. Poon
Attorney, Agent, or Firm—James B. Middleton

[57] ABSTRACT

A shopping cart has automatically applied brakes when the cart is at rest. The braking for the cart is by rotating the two casters to be non-parallel to each other so the cart will not roll. Any structure for rotating the casters may be used, but the preferred embodiment has an undulating upper bearing race so the weight of the cart urges the upper race down and causes the balls to seek high points on the upper race. The balls are caged, and the cage is fixed to the lower race, so the wheels of the casters are rotated when the balls enter the high areas. The upper bearing races are oriented to achieve the desired positioning of the caster wheels.

5 Claims, 1 Drawing Sheet

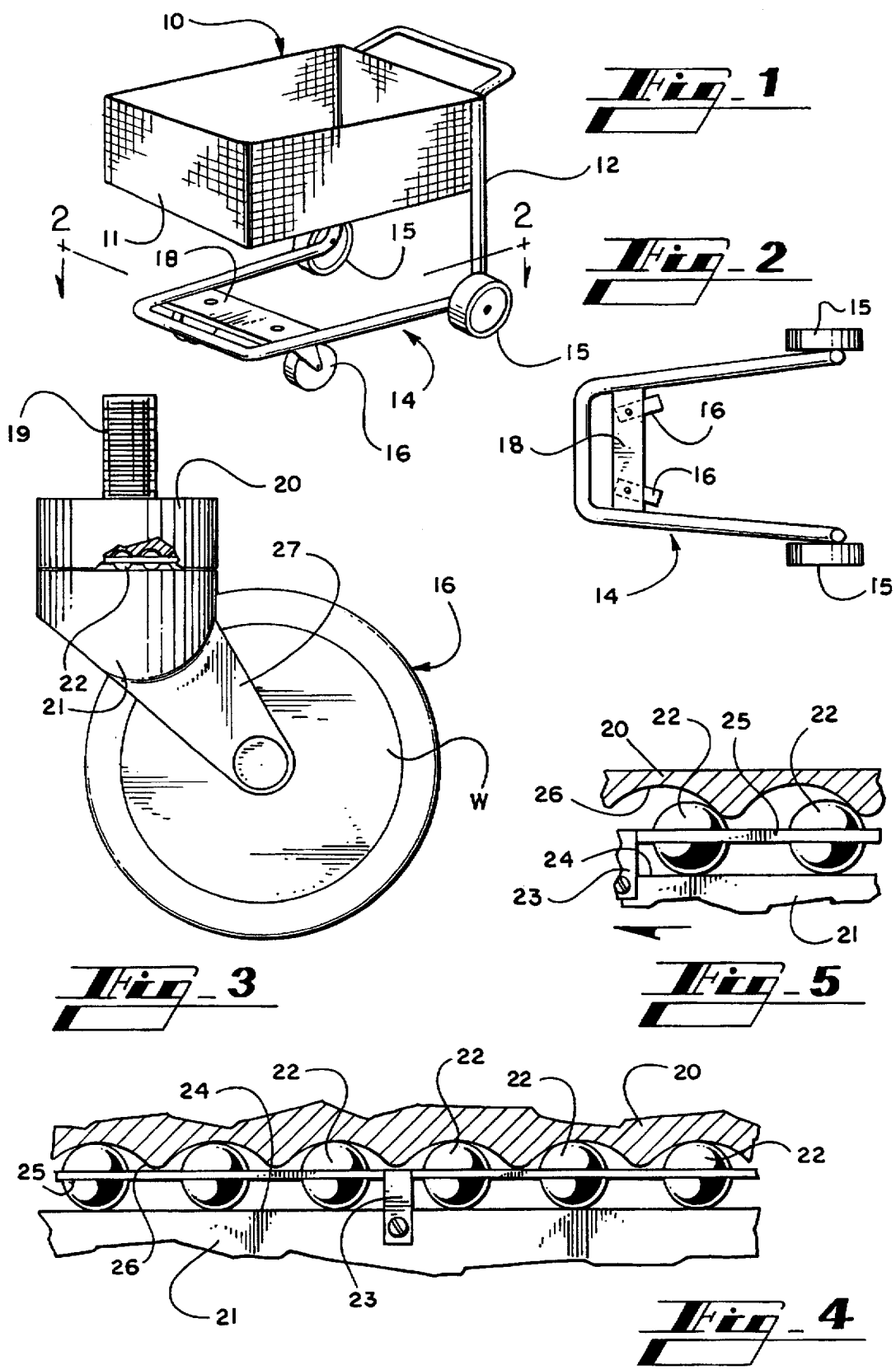

BRAKING MEANS FOR SHOPPING CART

BACKGROUND OF THE INVENTION

1. Field of the Invention

This invention relates generally to braking means for carts and the like, and is more particularly concerned with means for rotating at least two wheels of a shopping cart to a position to prevent unwanted rolling of the cart.

2. Discussion of the Prior Art

Shopping carts are provided for the customers of a number of stores, including grocery store, drug stores, hardware stores and others. Many of these stores allow a customer to roll the cart to the parking lot for carrying purchases to the customer's vehicle. Though corrals for carts are usually provided in parking lots, many customers fail to utilize the corrals, and simply leave the cart in the parking area. Once the cart is left unattended, the cart is likely to roll. Sometimes the cart is on a slight hill, causing the rolling. Other times, the wind may cause the cart to roll, or someone may bump the cart to cause it to roll. The rolling cart, regardless of the cause, is a hazard in a parking lot in that it can engage vehicles and dent them. A report by a television station indicated that the damage done to automobiles by shopping carts is over 300 million dollars. Even when attempting to unload a cart, the cart sometimes tends to roll if the cart is on a sloped surface. Thus, there has long been a need for some form of braking means for shopping carts. There have been some efforts at providing braking means for a shopping cart, but the prior art brakes have been relatively complex, and have usually been integrally formed with the cart so the brakes cannot be added to an existing cart. Locking wheels are well known, but these require that the user step on small pedals to lock or un-lock each wheel. The usual customer cannot be expected to manipulate such brakes appropriately, especially during the stop-start motions of shopping.

Thus, the prior art has not provided easy to use, automatically operating braking means for shopping carts.

SUMMARY OF THE INVENTION

The present invention provides braking means for a shopping cart or the like, the braking being provided by turning the two casters on the cart to non-parallel positions. When then cart is pushed, the pushing force will easily cause the casters to become parallel so the cart rolls easily; but, when the cart is being stopped, the casters will be rotated to non-parallel positions In the embodiment of the invention disclosed herein, the casters include ball bearings for rotation of the wheel about a vertical axis, and the upper race has an undulating surface. When the caster is oriented for the cart to go straight ahead, the balls are on low points of the undulating race; and, when the cart is about to stop, the weight will cause the balls to roll "down hill", causing rotation of the caster about the vertical axis. The bearing races will be adjusted so that the two casters are non-parallel when the balls are on the high points of the races. The ball bearings are preferably caged, and the cage is fixed with respect to the caster; then, as the balls roll, the lower race and the caster must rotate relative to the upper race.

BRIEF DESCRIPTION OF THE DRAWINGS

These and other features and advantages of the present invention will become apparent from consideration of the following specification when taken in conjunction with the accompanying drawings in which:

FIG. 1 is a perspective view showing a generally conventional shopping cart having two casters as front wheels, the casters being constructed in accordance with the present invention;

FIG. 2 is a cross-sectional view taken along the line 2—2 in FIG. 1;

FIG. 3 is an enlarged side elevational view, partially broken away, showing one caster made in accordance with the present invention;

FIG. 4 is an enlarged, fragmentary unrolled view showing the bearing races in the caster of FIG. 3; and, FIG. 5 is a fragmentary view similar to FIG. 4, but showing the balls on the lower part of the upper race.

DETAILED DESCRIPTION OF THE EMBODIMENT

Referring now more particularly to the drawings and to that embodiment of the invention here presented by way of illustration, FIG. 1 shows a shopping cart 10 including a basket 11 supported on a frame 12. A lower frame 14 has two rear wheels 15 and two forward casters 16. The casters 16 are here shown as fixed to a plate 18 extending across the lower frame 14. The cart described thus far is conventional. Those skilled in the art will understand that there are numerous modifications of the cart, and the braking means of the present invention is adaptable to any cart, so long as the cart can be provided with two casters.

In FIG. 2 of the drawings only the lower frame 14 is shown, along with the rear wheels 15 and forward casters 16. It should be noticed that the casters 16 are rotated so they are not parallel. In this position, it will of course be understood that the cart will not easily roll. Only by urging the casters 16 into parallelism will the cart roll easily. Thus, urging the casters 16 into non-parallelism acts as braking means for the cart 10. Those skilled in the art will understand that the particular angle shown in FIG. 2 is not critical; rather, any angular position of the casters 16 will act as braking means so long as the casters are not parallel to each other.

Turning now to FIG. 3 of the drawings, one of the casters 16 is shown. The caster 16 includes a stud 19 which can extend through (for example) the plate 18 for mounting the caster 16 on a cart 10. The stud 19 extends from an upper bearing plate 20. The upper bearing plate 20 is rotatably fixed to a lower bearing plate 21; and, between the upper and lower plates 20 and 21 is a set of balls 22. As is conventional, the upper plate 20 defines an upper bearing race and the lower plate 21 defines a lower bearing race. The lower bearing race carries a fork 27 which mounts the wheel W. The two bearing races are better shown in FIG. 4 of the drawings.

Looking primarily at FIG. 4, it will be seen that the lower bearing race 24 is a generally flat surface. The balls 22 that roll on the flat surface are caged by a cage 25; and the cage 25 is fixed to the lower plate 21, as by a tab 23. The upper bearing race 26 has an undulating configuration so that, as the balls 22 move between the upper and lower races, the upper race must move up and down.

As shown in FIG. 4, the balls 22 are on the uppermost portions of the race 26, so the race 26 and the bearing plate 20 are in their lowest positions. When the balls 22 roll to place the lower points of the race 26 on the balls 22, the race 26 and the plate 20 will be in their highest positions. The latter is illustrated in FIG. 5 of the drawings.

With the above and foregoing description in mind, the operation of the device should be understood. When the cart 10 is moving very slowly, approaching a stop, the weight of the cart will urge the bearing plates 20 down, forcing the balls 22 to roll to the highest parts of the upper race 26. As the balls 22 rotate, since the balls are within the cage 25, the cage 25 will move with the balls. Also, the cage 25 is fixed to the lower plate 21 by the tab 23, so the lower plate 21 will move. The parts will be arranged such that, when the balls are in the highest parts of the race 26, the casters 16 will be non-parallel. Thus, any time the cart 10 approaches a stop, the casters 16 will be urged to a non-parallel position to act as braking means for the cart.

When a person wishes to move the cart 10, one will simply push the cart 10 as is conventional. The pushing force applied will force the casters 16 to be parallel to each other, and parallel to the direction of motion. The device will also be designed so that, when the cart is moving forward, the ball bearings in the casters 16 will be substantially as shown in FIG. 5 of the drawings. As a result, any time the cart approaches a stop, the weight of the cart will cause the casters 16 to rotate as previously described.

With the bearing race as shown, the casters are most likely to be rotated to braking position when the cart is moving very slowly, just before stopping. The casters will be easier to move in this dynamic situation than in the static situation wherein the cart is completely stopped. Nevertheless, the present invention contemplates the rotation of casters to non-parallel positions for braking, regardless of when the casters are so rotated.

It will therefore be understood that the present invention provides a braking means for a cart or the like, the braking means being very simple and effective. Simply by urging the casters in a cart to assume non-parallel positions, the cart is effectively braked. While an undulating bearing race is utilized in the embodiment here shown, it will be recognized that springs or other means for orienting the casters may also be effective.

It will therefore be understood by those skilled in the art that the particular embodiment of the invention here presented is byway of illustration only, and is meant to be in no way restrictive; therefore, numerous changes and modifications may be made, and the full use of equivalents resorted to, without departing from the spirit or scope of the invention as outlined in the appended claims.

I claim:

1. Braking means for a shopping cart, wherein said cart comprises a support frame carrying a basket, a pair of wheels rotatably fixed to said frame, and a pair of casters fixed to said frame, said pair of casters comprising a first caster rotatable about a first vertical axis and a second caster rotatable about a second vertical axis, said braking means comprising means for urging said first caster and said second caster to rotate about said first and second vertical axes, for orienting said first caster and said second caster to be non-parallel to each other.

2. Braking means as claimed in claim 1, wherein said casters include a ball bearing concentric with said vertical axes, each ball bearing including an upper race and a lower race with a plurality of balls therebetween, and wherein one of said races has an undulating configuration.

3. Braking means as claimed in claim 2, wherein said upper race is undulating, and further including a cage for said balls, said cage being fixed with respect to said lower race.

4. A caster for a shopping cart, said caster comprising a wheel mounted for rotation about a horizontal axis, a fork carrying said wheel, a vertically extending stud for fixing said caster to said shopping cart, an upper bearing race fixed with respect to said stud, a lower bearing race fixed with respect to said fork, and a plurality of balls disposed between said upper race and said lower race, said upper race including an undulating surface including high areas and lower areas, so that the downward force of said cart on said stud tends to urge said balls to said high areas of said upper race.

5. A caster as claimed in claim 4, and further including a cage for said plurality of balls, and means for fixing said cage with respect to said lower race.

* * * * *